United States Patent
Guru et al.

(10) Patent No.: US 10,260,972 B1
(45) Date of Patent: Apr. 16, 2019

(54) SYSTEM AND METHOD FOR MONITORING INSTALLATION AND HEALTH OF BELT DRIVEN MOTOR/DRIVE APPLICATIONS

(71) Applicant: Rockwell Automation Technologies, Inc., Mayfied Heights, OH (US)

(72) Inventors: Arun K. Guru, Brookfield, WI (US); Linglai Li, Shanghai (CN); John Balcerak, Muskego, WI (US); Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/145,843

(22) Filed: Sep. 28, 2018

Related U.S. Application Data

(60) Provisional application No. 62/583,005, filed on Nov. 8, 2017.

(51) Int. Cl.
*B65G 43/02* (2006.01)
*G01L 5/04* (2006.01)

(52) U.S. Cl.
CPC .............. *G01L 5/042* (2013.01); *B65G 43/02* (2013.01); *B65G 2207/48* (2013.01)

(58) Field of Classification Search
CPC ................................. B65G 43/02; G01L 5/042
USPC ........ 198/502.1, 502.2, 502.3, 502.4, 810.03
See application file for complete search history.

(56) References Cited

U.S. PATENT DOCUMENTS

| | | | |
|---|---|---|---|
| 6,237,752 B1 * | 5/2001 | El-Ibiary ................ | B65G 39/16 198/810.03 |
| 6,712,200 B2 * | 3/2004 | Ubaldi .................... | B65G 39/16 198/810.01 |
| 7,624,857 B2 * | 12/2009 | Kusel ..................... | B65G 43/02 198/502.4 |
| 7,864,067 B2 * | 1/2011 | Smith .................... | B65G 43/00 198/810.01 |
| 7,905,346 B2 * | 3/2011 | Enomoto ............... | B41J 11/007 198/807 |
| 7,987,971 B2 * | 8/2011 | Kimura ............. | G03G 15/2053 198/810.03 |
| 8,381,902 B2 * | 2/2013 | Morita ............. | G01M 17/0074 198/807 |
| 8,604,776 B2 * | 12/2013 | Lynn ................... | G01M 13/023 324/160 |
| 9,227,791 B2 * | 1/2016 | DePaso .................. | B65G 43/00 |
| 9,533,832 B1 * | 1/2017 | Wheat .................... | B65G 43/04 |
| 10,023,397 B1 * | 7/2018 | Brown ................... | B65G 43/10 |
| 2014/0330430 A1 * | 11/2014 | Waller et al. | |

* cited by examiner

*Primary Examiner* — Douglas A Hess
(74) *Attorney, Agent, or Firm* — Boyle Fredrickson, SC

(57) ABSTRACT

An improved system for monitoring drive members in a belt-driven application during installation and during operation and for detecting common failure modes in belt-driven equipment is disclosed. Sensors are positioned within or proximate the motor housing to detect vibrations on the belt or in the electric machine. The vibration signals are used to monitor operating conditions and/or to identify the failure modes in belt-driven equipment. The vibration signals may be used, for example, to determine tension on a belt, detect either a static or dynamic force applied along the belt, a misalignment between a pulley and the belt, or a shock load applied to the belt during operation. By monitoring the various operating conditions of the belt-driven equipment, a controller may identify an existing failure mode or predict a premature failure mode.

20 Claims, 7 Drawing Sheets

SYSTEM AND METHOD FOR MONITORING INSTALLATION AND HEALTH OF BELT DRIVEN MOTOR/DRIVE APPLICATIONS

CROSS-REFERENCE TO RELATED APPLICATIONS

This application claims priority to U.S. provisional application Ser. No. 62/583,005, filed Nov. 8, 2017, entitled System and Method for Protection of Machines Against Failures in Belt Driven Applications, the entire contents of which is incorporated herein by reference.

BACKGROUND OF THE INVENTION

The subject matter disclosed herein relates generally to commissioning and monitoring of operating conditions for belt-driven applications and, more specifically, to a system for detecting vibration signals using sensors mounted to the electric motor to measure belt tension and to prevent belt failures in belt-driven equipment connected to the electric motor.

Electrical rotating machines, such as electric motors or generators, have become widespread and are found in numerous applications and configurations. Electric machines include a stationary component (i.e., the stator) and a rotating component (i.e., the rotor). In electric motors, a magnetic field is established in the rotor, for example via magnets mounted to the rotor or via an electrical current applied to or induced in a coil wound on the rotor. A second, rotating magnetic field is established as a result of the application of a controlled voltage to the stator, and the rotation of the magnetic field in the stator causes the magnetic field in the rotor to rotate, thereby causing rotation of the rotor. A shaft or other drive member is mounted to the rotor and extends outside the rotor housing providing a mechanical coupling to a device, such as a gearbox, pump, or fan that is to be driven as the rotor rotates. In some applications, the mechanical coupling may be made with a drive belt extending between the drive shaft of the motor and a drive pulley on the belt-driven equipment.

Belt drives may be used in a number of different industrial applications. The belt drive may be, for example, a timing belt, a V-belt, a ribbed belt, an open-ended belt, or an endless belt. The belt drive may be used to transfer power from a motor to a load, provide a direct coupling to a load for limited linear travel applications, or provide an indirect coupling to a load for conveying material in an endless loop. Applications include machine tools, printing, packaging, synchronous conveyors, separators, accumulators, and the like.

During installation, the belt is looped around one or more pulleys to transfer power from the motor to the load. The belt is looped around a drive shaft of the motor, or around a pulley mounted to the drive shaft, and similarly looped around a second pulley or a driven shaft at the belt-driven equipment. One or more additional pulleys or driven members may be included between the motor and the belt-driven equipment to drive additional pieces of equipment, route the belt, change rotation direction, and/or to provide tension in the belt. As the belt is looped around each pulley, the belt may be misaligned either via an offset to one side of the pulley or angularly with respect to the axis of rotation of the pulley on which it is mounted. Further, if tension in the belt-drive system is not properly set, either over or under tension of the belt will be present in the system. Both misalignment and improper tension may lead to excessive wear and/or premature failure of a component in the belt-drive system.

Thus, it would be desirable to detect misalignment, improper tension, or a combination thereof during installation or replacement of a belt in belt-driven equipment.

Due to the rotational nature of an electric machine and the components in the belt-drive system, misalignment and/or improper tension may generate an imbalance in the system due either directly to misalignment or indirectly to excessive wear of components caused by improper tension. During operation of the motor and belt-driven equipment, imbalances can result in vibrations or resonance being generated within the belt-drive system. These vibrations or resonances may not occur throughout the operating range of the motor but may occur at specific operating frequencies. The vibrations may cause excessive wear and/or premature failure of a component in the belt-driven system.

Thus, it would be desirable to monitor operation of drive members in a belt-driven application to detect vibrations present in the system to identify the potential failure of components prior to failure.

In addition to the wear caused by vibration, a shock load applied to the belt-drive system can cause catastrophic failure. If a single shock load does not cause catastrophic failure, it may still cause vibration and/or excessive wear of the belt-drive system. Repeated shock loads may, in turn, result in premature failure.

Thus, it would be desirable to provide a system to monitor operation of drive members in a belt-driven application to detect shock loads occurring in the system.

BRIEF DESCRIPTION OF THE INVENTION

The subject matter disclosed herein describes an improved system for monitoring drive members in a belt-driven application during installation and during operation and for detecting common failure modes in belt-driven equipment. Sensors are positioned within or proximate to the motor housing to detect vibrations on the belt or in the electric machine. The vibration signals are used to monitor operating conditions and/or to identify the failure modes in belt-driven equipment. The vibration signals may be used, for example, to determine tension on a belt, detect either a static or dynamic force applied along the belt, a misalignment between a pulley and the belt, or a shock load applied to the belt during operation. By monitoring the various operating conditions of the belt-driven equipment, a controller may identify an existing failure mode or predict a premature failure mode.

According to one embodiment, a system for monitoring operation of drive members in a belt-driven system includes at least one sensor configured to generate a signal corresponding to a vibration present on a belt in the belt-driven system and a motor controller. A motor is connected to and is operative to drive the belt, and the motor controller is configured to control operation of the motor. The motor controller includes an input configured to receive the signal corresponding to the vibration present on the belt from the at least one sensor, a memory device operative to store a plurality of configuration parameters and a plurality of instructions, and a processor configured to execute the plurality of instructions. The processor is configured to execute the instructions to receive the signal from the at least one sensor corresponding to the vibration present on the belt and to determine a tension present on the belt as a function of the signal corresponding to the vibration present on the motor.

According to another embodiment of the invention, a method for monitoring operation of drive members in a belt-driven system is disclosed. A signal is received at an input of a motor controller from at least one sensor corresponding to a vibration present on a belt in the belt-driven system. A motor is connected to and controlled by the motor controller, and the motor is operative to drive the belt. The motor controller determines a frequency of vibration present in the belt-driven system as a function of the signal received at the motor controller and determines a tension present on the belt as a function of the frequency of vibration present in the belt-driven system.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
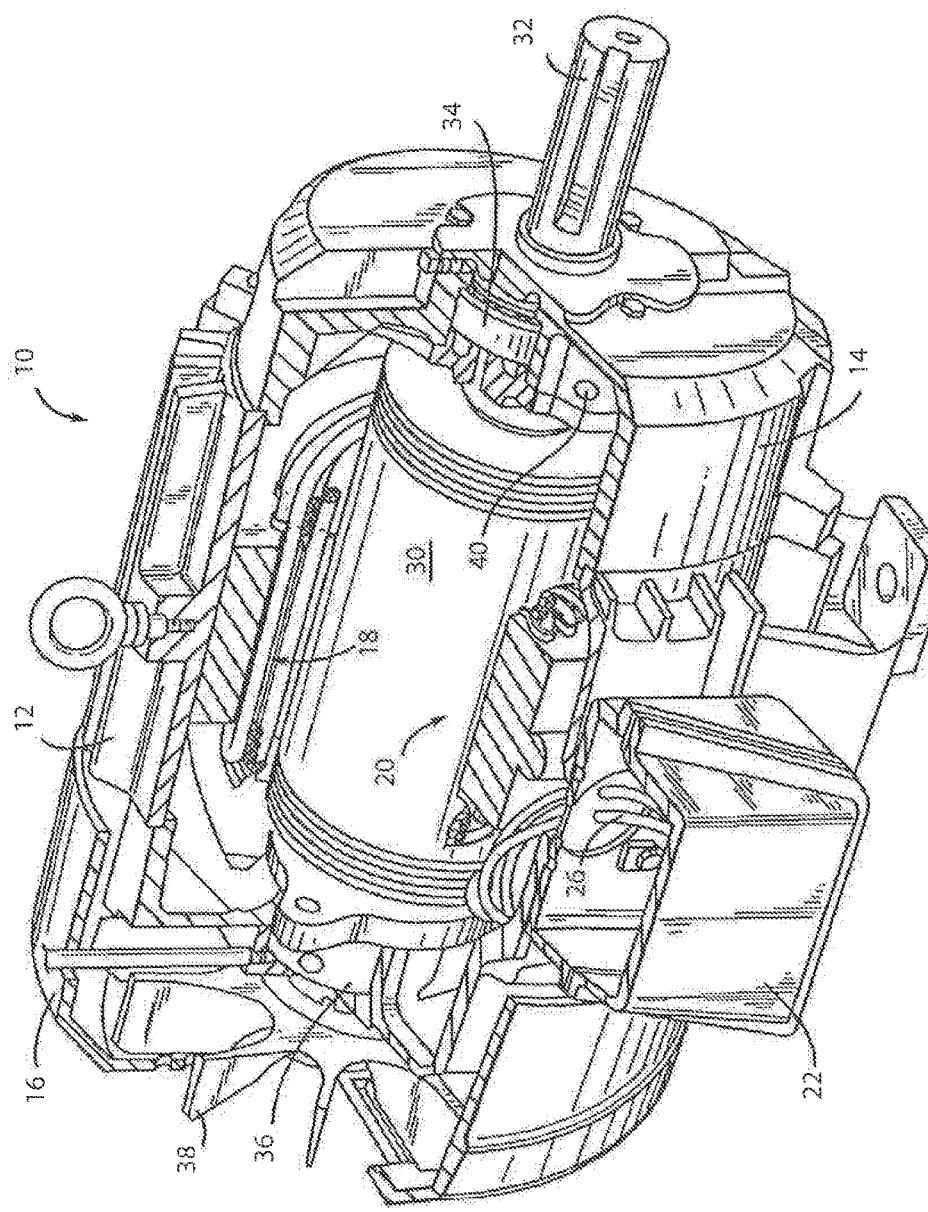
FIG. 1 is a perspective view of a motor with a portion of the housing cutaway to illustrate a portion of the internal components of the motor according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 3:
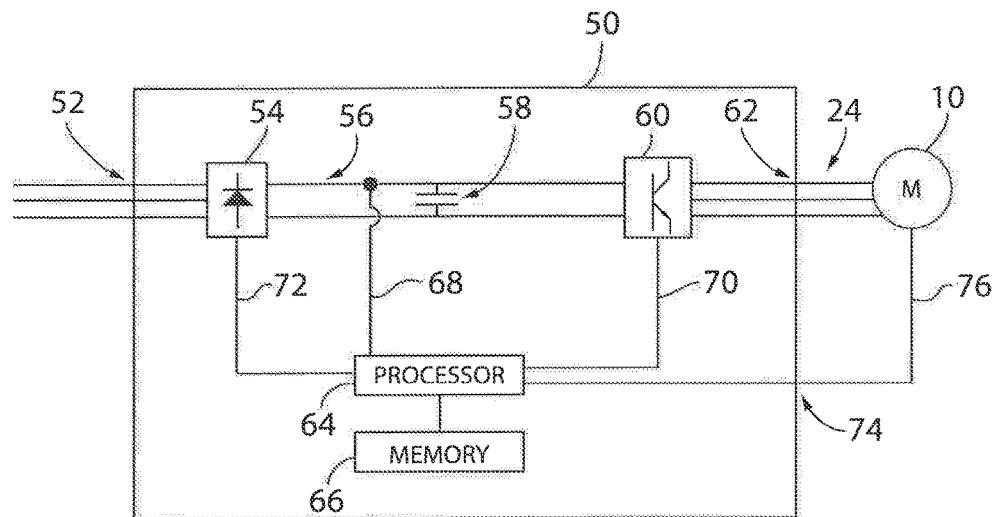
FIG. 3 is a block diagram representation of a motor controller connected between a power supply and a motor according to one embodiment of the invention.

Turning initially to FIG. 1, an exemplary motor 10 incorporated in one embodiment of a belt-drive system and configured to aid in monitoring operation of and detecting common failure modes in belt-driven equipment is illustrated. The motor 10 includes a frame 12 open at each end. A front end cap 14 and a rear end cap 16 enclose each end and, in combination with the frame 12, define a housing for the motor 10. The motor 10 includes a stator assembly 18, configured to receive a voltage to control operation of the motor 10, and a rotor assembly 20 configured to rotate as a function of the voltage applied to the stator assembly 18. A junction box 22 is mounted to the frame 12 and is configured to receive motor leads 24 from a motor controller 50 (as shown in FIG. 3) which are, in turn, connected to leads 26 from the stator assembly 18 within the junction box 22, establishing an electrical connection between the stator assembly 18 and the motor controller 50.

The rotor assembly 20 includes a rotor 30 and a motor shaft 32. The motor shaft 32 may extend all the way through the rotor 30 or, optionally, a first portion of the shaft may extend from the front of the rotor assembly 20 and a second portion may extend from the rear of the rotor assembly 20. The shaft 32 extends through an opening in the front end cap 14 for mechanical coupling to a driven machine. A pulley may be mounted to the shaft 32 on which a belt may, in turn, be mounted. The rotor assembly 20 is supported for rotation within the housing by a front bearing set 34 and a rear bearing set 36, located within the front end cap 14 and the rear end cap 16, respectively. In the illustrated embodiment, a cooling fan 38 draws air in through the openings in the rear end cap 16 which passes over and cools both the stator assembly 18 and the rotor assembly 20. The rotor assembly 20 may include magnets mounted on the surface or embedded within the rotor 30 to generate a magnetic field. Optionally, the rotor 30 may include a coil or a set of coils configured to receive a voltage, for example, via slip rings mounted to the rotor assembly 20 or via induction from the voltage applied to the stator assembly 18. It is contemplated that the various other configurations and arrangements of the motor 10 may be utilized without deviating from the scope of the invention.

Control of the motor 10 may be accomplished with a motor controller 50. Referring next to FIG. 3, a motor controller 50 according to one embodiment of the invention includes a power input 52 configured to be connected to a power source. According to the illustrated embodiment, a three-phase alternating current (AC) power source is connected to the power input 52. Optionally, the motor controller 50 may be connected to a single-phase AC power source or to a direct current (DC) power source. A rectifier section 54 converts the three-phase AC power to a DC voltage present on the DC bus 56. The rectifier section 54 may be a passive rectifier, including, for example, diode bridge rectification, or an active rectifier, including, for example, semiconductor switching devices such as an insulated gate bipolar transistor (IGBT), a metal oxide semiconductor field-effect transistor (MOSFET), a silicon-controlled rectifier (SCR), a thyristor, or any other suitable controlled switching device. The rectifier section 54 may transmit or receive signals 72 with the processor 64 including, but not limited to, feedback signals generated by sensors located in the rectifier section 54 corresponding to a current and/or a voltage present at the input to or output from the rectifier section 54 or switching signals generated by the processor 64 to control switching devices in an active rectifier. The DC bus 56 includes a capacitance 58 connected between a positive rail and a negative rail across which the DC voltage potential is present. It is contemplated that the positive rail and the negative rail may each have a positive voltage potential, a negative voltage potential, or be connected to a common voltage potential. Typically, the positive rail has a greater voltage potential than the negative rail. The processor 64 may also receive signals 68 from a sensor connected to the DC bus including, for example, a signal corresponding to the voltage and/or current present on the positive rail, the negative rail, or between the two rails. An inverter section 60 converts the DC voltage present on the DC bus 56 to an AC voltage having a variable frequency and a variable magnitude. The inverter section 60 includes, for example, semiconductor switching devices such as IGBTs, MOSFETs, SCRs, thyristors, or any other suitable controlled switching device. The inverter section 60 may transmit or receive signals 70 with the processor 64 including, but not limited to, feedback signals generated by sensors located in the inverter section 60 corresponding to a current and/or a voltage present at the input to or output from the inverter section 60 or switching signals generated by the processor 64 to control operation of the switching devices. The motor controller 50 includes a processor 64 configured to execute a series of instructions stored on a memory device 66. The processor 64 may be a single processing device or multiple processing devices executing in parallel. The processor 64 may be a field programmable gate array (FPGA), application specific integrated circuit (ASIC), digital signal processor (DSP), general purpose microprocessor, dedicated processor, or a combination thereof. The memory device 66 may be a single device or multiple devices and may include volatile memory, non-volatile memory or a combination thereof. The motor controller 50 also includes at least one input 74 configured to receive at least one feedback signal 76 from the motor 10. The processor 64 receives each feedback signal 76 from the input(s) 74, where the feedback signal may be, but is not limited to an angular position signal, an angular velocity signal, a current signal, a voltage signal, and a signal corresponding to an amplitude of vibration present in the motor 10.

Referring again to FIG. 1, the motor 10 includes at least one sensor 40 which is configured to generate a signal corresponding to the vibration present in the motor 10. According to the illustrated embodiment, the sensor 40 is mounted within the housing of the motor 10. Optionally, the sensor 40 may be mounted on the exterior of the housing or on a mechanical member coupled to the motor 10 such that the vibration detected in the sensor 40 corresponds to the vibration present in the motor 10. The sensor 40 may be, for example, an accelerometer, generating a signal corresponding to the acceleration in one or more axes of the motor 10, an acoustic sensor, detecting a frequency of noise generated due to a vibration in the system, or an ultrasonic measuring sensor, detecting variation in a distance of a surface from the sensor as a result in vibration. In one embodiment of the invention, the sensor is a microelectromechanical system (MEMS). In a belt-driven system, such as the system 211 illustrated in FIG. 8, the vibration in the motor 10 may be a result of vibration in a belt 214 coupled to the motor, where the vibration is transferred through the coupling or drive elements between the motor and the belt.

Figure 2:
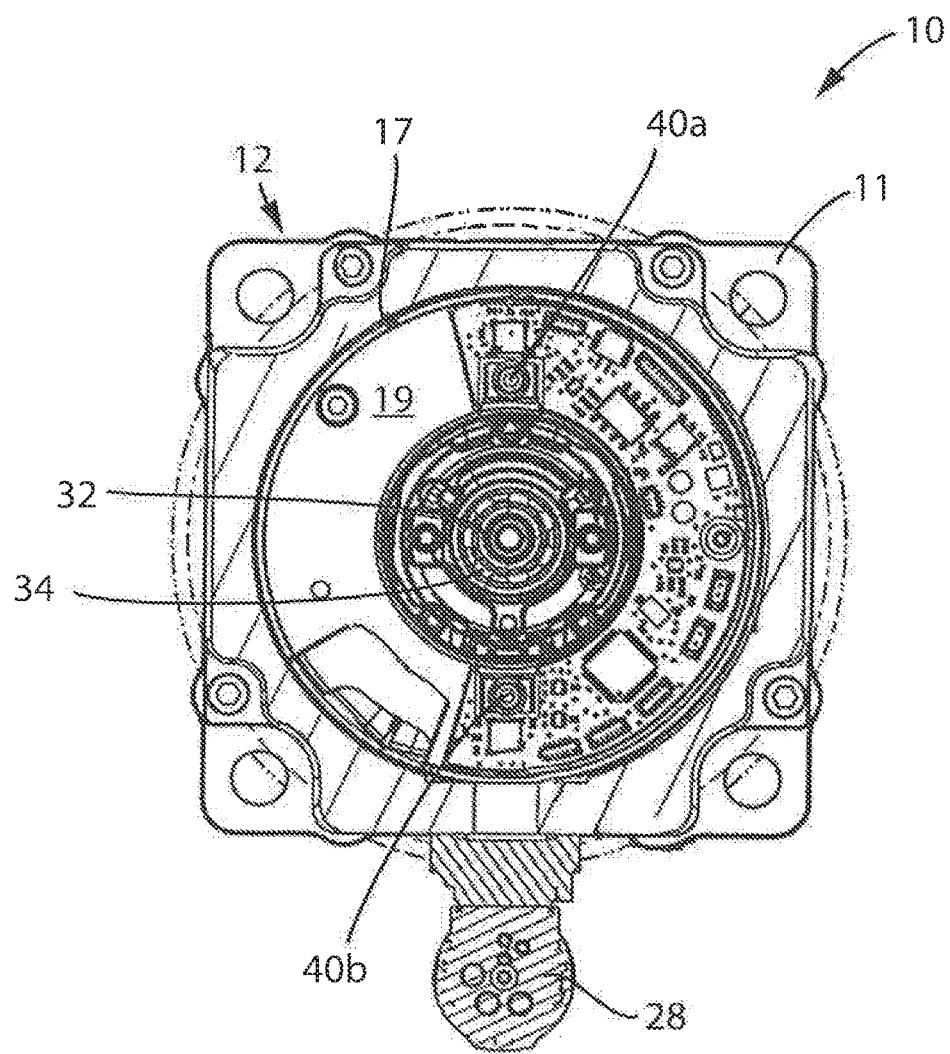
FIG. 2 is a front elevational view a motor with a circuit board located in the end of the housing to which vibration sensors are mounted according to another embodiment of the invention.

Referring also to FIG. 2, another exemplary motor 10 incorporated into a belt-drive system is illustrated. The motor 10 includes a mounting plate 11 on one end of the frame 12 by which the motor 10 is connected to a drive train. As illustrated, the mounting plate 11 includes a recessed portion 17 within which a circuit board 19 is mounted. The circuit board 19 includes a first sensor 40a mounted on the top and a second sensor 40b mounted on the bottom of the board. Optionally, the circuit board 19 may include a single sensor 40 or include still additional sensors located, for example, on the left and right sides of the motor shaft 32.

Figure 5:
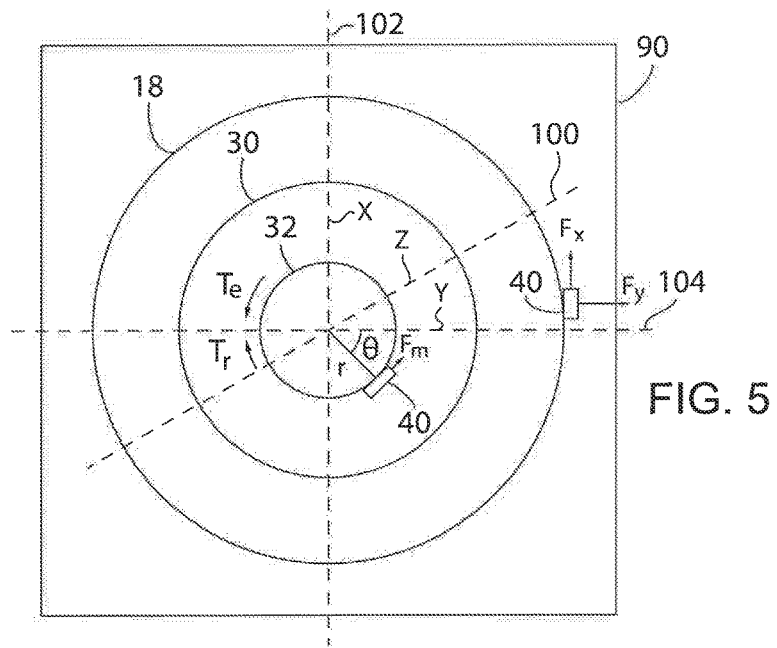
FIG. 5 is a block diagram representation of sensor placement within a motor housing according to one embodiment of the invention.

According to another embodiment of the invention, illustrated in FIG. 5, a first sensor 40 may be mounted on and rotate with the shaft 32 to directly detect vibration on the shaft 32. The motor 10 is illustrated in block diagram form by a series of concentric circles with the stator assembly 18 as the outermost circle, the rotor 30 as the intermediate circle, and the motor shaft 32 as the innermost circle. Optionally, the sensor 40 may also include a transceiver portion (not shown) mounted to a non-rotational location proximate to the shaft 32 and configured to receive the signal corresponding to the acceleration in each axis. The signal may be communicated, for example, from the rotating portion of the sensor 40 via wireless communications or via a slip ring configuration to the transceiver portion, which, in turn, transmits the signal to a controller. It is also contemplated that the signal may be communicated directly to another controller, such as the motor controller 50. The motor 10 may also include a second sensor 40 mounted to the non-rotational portion of the motor 10. As illustrated, the second sensor 40 is mounted to the stator assembly 18. However, it could similarly be mounted, for example, to an internal surface of the housing or to a bearing set within the motor 10. A signal corresponding to the vibration experienced by the housing of the motor 10 may be generated by the second sensor 40. With signals generated both by the sensor 40 mounted on the shaft 32, or another rotational portion of the motor 10, and the sensor 40 mounted to the non-rotational portion of the motor 10, a controller may differentiate between vibrations experienced generally by the motor 10 from vibrations present only on the motor shaft 32.

Figure 6:
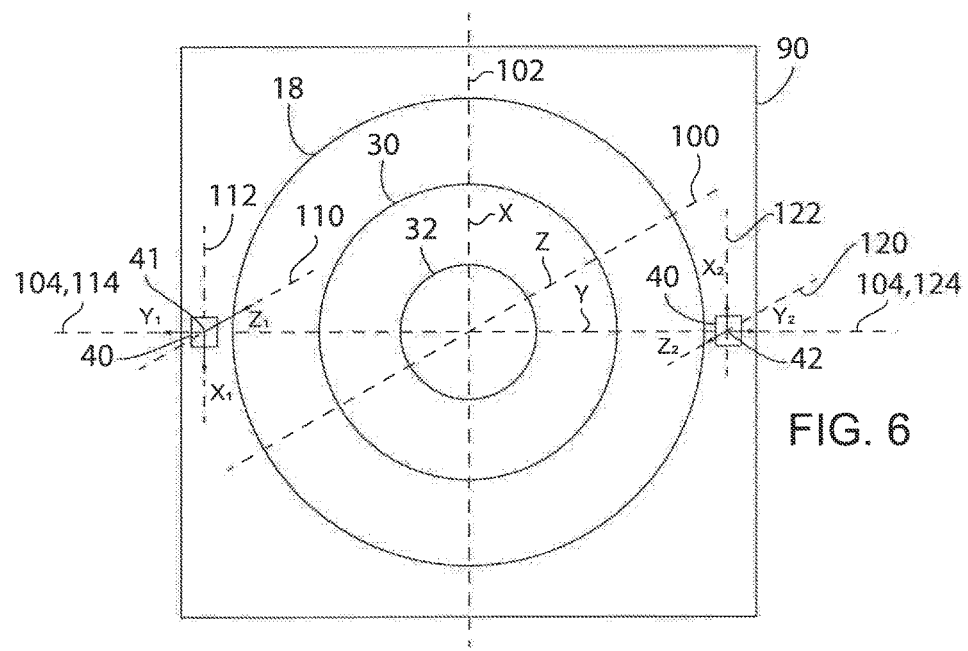
FIG. 6 is a block diagram representation of sensor placement within a motor housing according to another embodiment of the invention.

According to another embodiment of the invention, two sensors 40 may be mounted to non-rotational portions of the motor 10. Referring also to FIG. 6, a first sensor 40 is located at a first position 41 within the motor 10 and a second sensor 40 is located at a second position 42 within the motor 10. The motor 10 is illustrated in block diagram form by a series of concentric circles with the stator assembly 18 as the outermost circle, the rotor 30 as the intermediate circle, and the motor shaft 32 as the innermost circle. According to one embodiment of the invention, both the first and second sensors 40 are mounted on a bearing set 34 by which the rotor 30 is rotatably mounted to the housing. Each of the sensors 40 may be mounted on opposite sides of the shaft 32 or of the portion of the rotor 30 supported by the bearing set 34.

A plane 90 orthogonal to the rotor shaft 32 and axes of each sensor and of the motor is also shown in FIG. 6. A first, central axis 100 defines the axis about which the motor shaft 32 rotates and extends through the motor 10. A second axis 102 is defined as orthogonal to the central axis 100 and extends between a top and a bottom of the motor 10. A third axis 104 is defined as orthogonal to both the central axis 100 and the second axis 102, extending between the sides of the motor 10. The second axis 102 and the third axis 104 exist within plane 90. Additionally, references to the top, bottom, and/or sides or for illustration only. It is contemplated that the second axis 102 and the third axis 104 may be rotated within the plane 90 orthogonal to the rotor shaft 32 without deviating from the scope of the invention. As illustrated, the central axis 100 is defined as a "Z" axis, the second axis 102 is defined as a "X" axis, and the third axis 104 is defined as a "Y" axis of the motor 10. Each of the sensors 40 similarly has three axes illustrated. The sensor 40 at the first position 41 is shown with a Z axis 110 with a positive magnitude in the Z axis illustrated, $Z_1$, an X axis 112 with a positive magnitude in the X axis illustrated, $X_1$, and a Y axis 114 with a positive magnitude in the Y axis illustrated, $Y_1$. The sensor 40 at the second position 42 is shown with a Z axis 120 with a positive magnitude in the Z axis illustrated, $Z_2$, an X axis 122 with a positive magnitude in the X axis illustrated, $X_2$, and a Y axis 124 with a positive magnitude in the Y axis illustrated, $Y_2$. It is contemplated that each sensor 40 may detect vibration in either fewer or greater number of axes without deviating from the scope of the invention. Similarly, multiple sensors 40, each detecting vibration in a single axis may be used to detect vibration of the motor 10 in multiple axes. A positive magnitude of vibration for each axis of each of the sensors 40 is illustrated by the direction of the vectors, $X_1$, $Y_1$, $Z_1$, $X_2$, $Y_2$, and $Z_2$. Thus, the first sensor 40 and the second sensor 40 are mounted such that a vibration in the motor which generates a signal in the first sensor 40 having a positive magnitude will generate a signal in the second sensor 40 having a negative magnitude.

According to one embodiment of the invention, the two X axes, $X_1$ and $X_2$, are configured to measure vibrational forces tangential to the motor shaft 32 and in opposite directions. The two Y axes, $Y_1$, and $Y_2$, are configured to measure vibrational forces orthogonal to the central axis 100 of the motor shaft 32 surface and directed in opposite directions away from the motor shaft 32. The two Z axes, $Z_1$ and $Z_2$, are configured to measure vibrational forces aligned with but offset from the central axis 100 of the motor shaft 32 and in opposite directions. It is contemplated that each pair of sensors is positioned within the plane 90 orthogonal to the motor shaft 32 and such that each sensor 40 is positioned 180 degrees around the motor shaft 32 from the other sensor 40. Optionally, the sensors 40 may be positioned other than 180 degrees around the motor shaft 32 from each other. However, additional computation may be required to compensate for the sensor position if the sensors 40 are positioned other than 180 degrees around the motor shaft 32 from each other.

Figure 4:
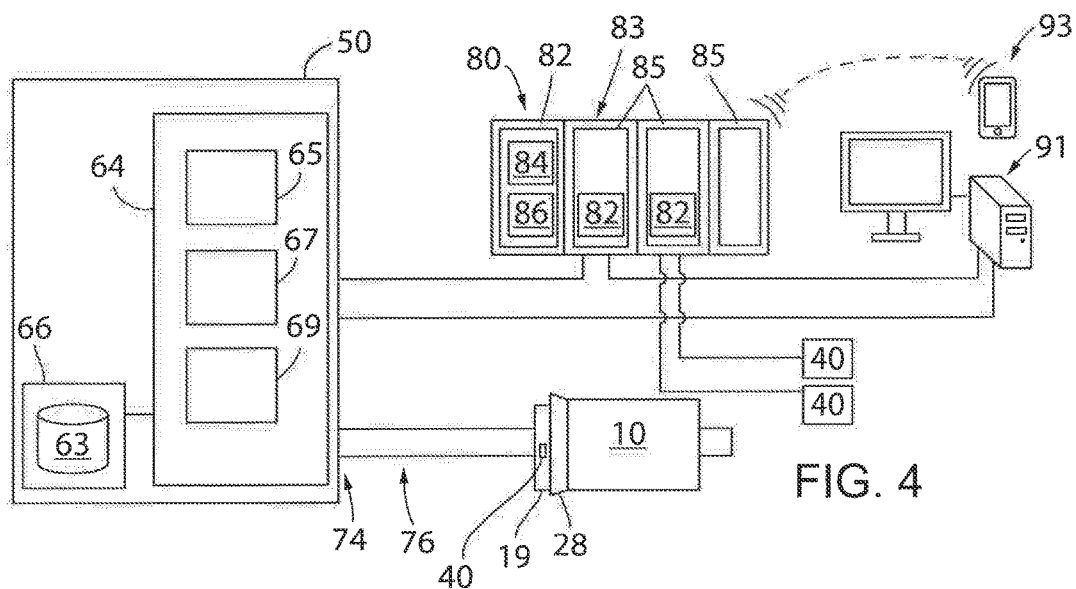
FIG. 4 is a block diagram representation of a controller operatively connected between vibration sensors and a motor controller according to one embodiment of the invention.

It is contemplated that the controller receiving the signals may be the processor 64 in the motor controller 50 or a second controller, such as a programmable logic controller (PLC) or other industrial controller. Referring, for example, to FIG. 4, a controller 80 is connected to multiple vibration sensors 40. A first vibration sensor 40 is illustrated on a circuit board 19 mounted within a motor 10. Additional vibration sensors 40 are shown without reference to a specific location, but may be mounted at different locations on the circuit board 19, at other locations within or on the motor 10, or may be mounted, for example, on a structural member to which the motor 10 is mounted. The controller 80 includes a logic circuit 82 configured to receive the data signals from the vibration sensors. The logic circuit 82 may include an analog to digital converter to convert the signals to a value suitable for input to a processor 84 on the controller 80. Optionally, the logic circuit 82 may include additional signal processing capabilities and may, for example, perform some initial processing such as adding or subtracting signals corresponding to the same axis of vibration and generated from vibration sensors 40. The controller 80 further includes a memory device 86 in communication with the processor 84. The processor may be further configured to execute instructions stored on the memory device 86 to perform additional processing of the signals and to generate command signals to control operation of the motor controller 50 as a function of the vibration signals. Similarly, the controller 80 may be configured to identify a vibration source in the belt-driven system as a function of the vibration signals.

According to the embodiment illustrated in FIG. 4, the controller 80 is an industrial controller, such as a programmable logic controller (PLC). The PLC includes a power supply and a processor module 81 housed in a rack 83 with multiple slots 85. A backplane extends between the processor module 81 and each slot 85 for communication with modules inserted into the slot. Various modules may be provided with each having different capabilities, including, but not limited to, an input module, an output module, a communication module, and the like. Input modules may each include a logic circuit 82 for receiving a signal from a vibration sensor 40. The input modules are configured to receive the analog vibration signals and include an analog to digital converter circuit and/or additional processing capabilities to transfer a digital value of the analog feedback signal to the processor module 81 via the backplane in the PLC.

According to the embodiment illustrated in FIG. 4, the motor controller 50 is illustrated with modules 65, 67, 69 executing on the processor 64, where the different modules act on the vibration signals as will be discussed in more detail below. It is contemplated that the controller 80 may also execute modules 65, 67, 69 to act on the vibration signals and the motor controller 50 may be configured to pass the vibration signals through to the controller 80 without additional processing. Optionally, a portion of the modules 65, 67, 69 may execute on the motor controller 50 and a portion of the modules may execute on the PLC 80. In still other embodiments of the invention, an industrial system or process controlled by the PLC may include multiple motors 10 and multiple motor controllers 50. A portion of the motor controllers 50 may execute the modules to act on the vibration signals corresponding to one or more belts in a first portion of the controlled system and the PLC 80 may execute similar modules to act on vibration signals corresponding to one or belts in a second portion of the controlled system.

Figure 7:
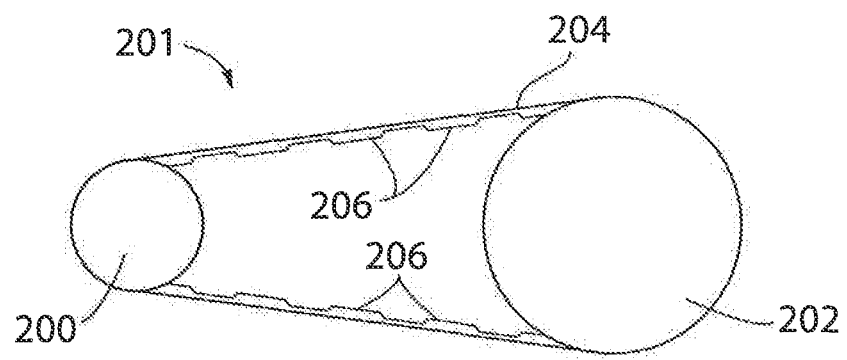
FIG. 7 is an elevational view of an exemplary belt-driven system incorporating one embodiment of the invention.

Referring next to FIG. 7, an exemplary belt-driven system 201 includes a first pulley 200 and a second pulley 202 connected via a belt 204. According to the exemplary system 201, the belt 204 includes teeth 206 configured to engage complementary gear teeth extending around the periphery of each pulley. The drive shaft 32 of a motor 10 may be mechanically coupled to either the first pulley 200 or to the second pulley 202 (i.e., the driver pulley) and the belt 204 is configured to drive the other pulley not coupled to the motor (i.e., the driven pulley). Varying the diameter of each pulley causes the speed and torque at each pulley to vary as is understood in the art.

Figure 8:
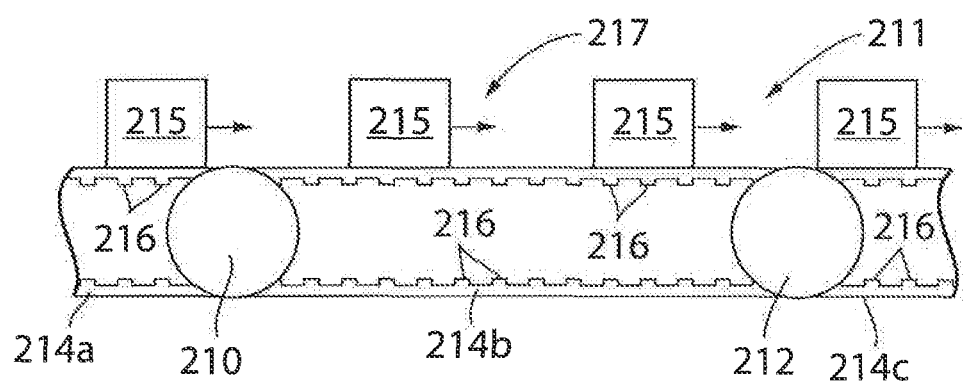
FIG. 8 is an elevational view of another exemplary belt-driven system incorporating one embodiment of the invention.

Turning next to FIG. 8, a second exemplary belt-driven system 211 includes a segment of a conveyor system moving objects 215 along a series of driven belts 214. The segment of the conveyor system includes a first conveyor pulley 210 and a second conveyor pulley 212. In the illustrated embodiment, it is contemplated that each conveyor pulley includes two grooves in which a belt 214 may run. In the first conveyor pulley 210 a first belt 214a engages a first groove and a second belt 214b engages a second groove. In the second conveyor pulley 212, the second belt 214b engages the second groove such that the belts 214 extend in a linear manner aligned with the pulleys 210, 212 along the length of the conveyor system. A third belt 214c engages the first groove of the second conveyor pulley 212. Additional belts 214 may extend along the length of the conveyor system alternately engaging the first and second grooves. In another embodiment of the invention, a single belt 214, or multiple lengths of belt spliced together, may extend along the length of the belt-drive system 211 or across more than two pulleys. Further, it is contemplated that a single motor may drive one of the conveyor pulleys 210, 212 while the remaining conveyor pulleys are driven by the series of belts 214. Optionally, each of the pulleys 210, 212 may be driven by separate motors operating in coordination with each other. In still other embodiments, a portion of the pulleys may be driven by a motor and a portion of the pulleys may be driven by the belts 214. It is contemplated that the present invention may be incorporated on still other configurations of belt driven systems where the belt driven system may be utilized to change the direction of rotation of a pulley, convert rotational motion to a linear or reciprocating motion, and the like.

In operation, the sensors 40 provide an improved system for monitoring operation of or detecting and identifying the source of vibration in a belt in a belt-driven system 201. The belt 204 is operatively connected to and driven by a motor 10 via a pulley 200 and drive shaft 32. The motor 10 is, in turn, controlled by a motor controller 50. Vibration in the belt 204 is translated to the motor 10 and/or to a mechanical structure on which the motor 10 is mounted. Sensors 40 placed within, on the surface of, or proximate to the motor 10 detect the vibration. The vibration may be caused by numerous sources including, but not limited to, mechanical resonance, shaft misalignment, belt misalignment, improper tension in a belt-driven system, or shock loading. It is contemplated that the motor controller may use the measured vibrations to determine a frequency of vibration present in the belt 204 and, in turn, determine a level of tension present on the belt 204 or determine the type.

During commissioning, the system may be used to monitor and adjust operation of drive members in the belt-driven system 201. After a belt 204 has been installed around the drive member(s) and the driven member(s), the tension present on the belt 204 needs to be verified. The belt-driven system is designed such that the belt has sufficient tension to transfer power between a drive member and a driven member, yet not too much tension which may result in premature wear and/or failure of the belt.

For illustration purposes, the belt-driven system 201 of FIG. 7 will be referenced. The second pulley 202 will be described as the drive pulley and is connected to a motor shaft 32. The first pulley 200 will be described as the driven pulley and is connected to a controlled device or process. The belt 204 is fit around the two pulleys and one of the pulleys 200, 202 includes a movable mount such that the position of the pulley is changed to apply tension to the belt 204. Optionally, a tensioner pulley (not shown) may be included in the belt-driven system 201, where the tensioner pulley is movably mounted and is configured to engage the belt 204 with different amounts of force to vary the tension on the belt 204.

Once the belt 204 is installed, an impulse force is applied to the belt 204. The impulse force may be applied manually by striking the belt. Optionally, the motor controller 50 is configured to apply an impulse, or short current pulse, to the motor 10 controlling the drive pulley 202. The impulse applied to the motor 10, in turn, generates a torque pulse on the drive shaft 32 and along the belt 204 operatively connected to the drive shaft via the drive pulley 202. During commissioning, it may be desirable to apply the impulse while the drive pulley 202 is in a static, or non-spinning, operational state because the controlled system may not be fully ready to run or it may be dangerous to apply full energy. If the motor controller 50 is utilized to apply an impulse, the impulse applies a momentary torque to the drive shaft 32 and, subsequently, the motor controller 50 commands the motor 10 to hold zero speed. As a result, the motor 10 receives and transfers the impulse to the drive pulley 202 and drive belt 204 but does not begin rotation of the pulley or belt.

After applying the impulse, the motor controller 50 monitors the feedback signal(s) corresponding to the vibration present along the belt 204. With reference to FIG. 4, a belt tension module 69 may be used to determine a tension present on the belt 204. As previously discussed, in one embodiment of the invention, the belt tension module 69 as well as the other illustrated modules 65, 67, execute on the motor controller 50. In another embodiment of the invention, the belt tension module 69 and other illustrate modules 65, 67 execute on the industrial controller 80. In still another embodiment, the modules 65, 67, 69 may execute on a combination of the motor controller 50 and the industrial controller 80. For ease of discussion, the modules will be discussed generally as executing on a controller, where the controller may be either the motor controller 50 or the industrial controller 80. The controller is operative to detect tension applied to the belt by measuring at least one characteristic of the vibration signal generated by the vibration sensor(s) 40 mounted proximate to or within the motor 10. The characteristics of the vibration signal to be monitored may include the belt natural frequency, an rms or a peak value of the vibration signal, the kurtosis of the vibration signal, or the crest factor of the vibration signal. According to the illustrated embodiment, a frequency response module 65 is provided which determines frequency components present in the vibration signal using, for example, a Fourier transform, a discrete Fourier transform (DFT), a Goertzel algorithm, or a combination or modification thereof. An exemplary embodiment of the frequency response module 65 is discussed in more detail below. An additional processing module 67 may be used to execute other routines that determine the peak, rms, kurtosis, or crest-factor values of the vibration signal. Each of the frequency response module 65 and additional processing module 67 may be called, for example, on a periodic interval or from the belt tension module 69. It is understood that illustrated division of modules is exemplary and not intended to be limiting. The functions performed by the various modules 65, 67, 69 may be executed in whole or in part by other modules or other combinations of modules.

Figure 11:
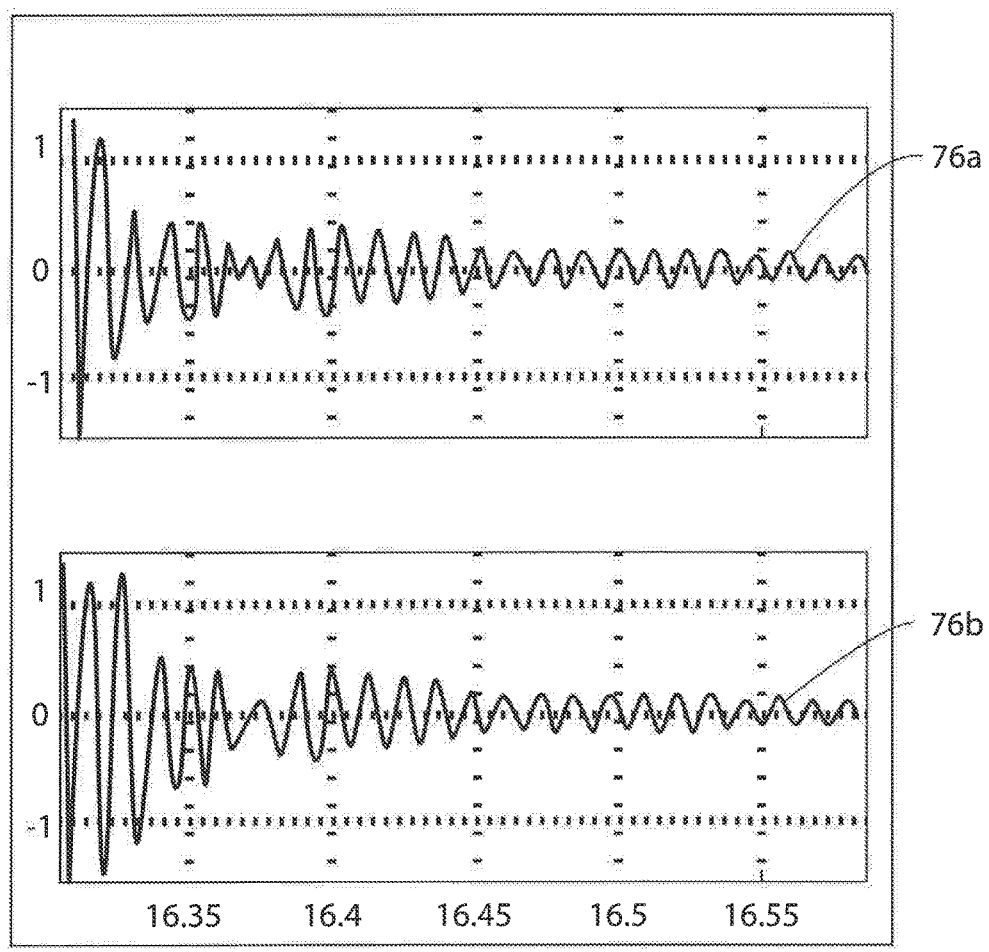
FIG. 11 is a graphical representation of a vibration signal generated by a vibration sensor utilized in one embodiment of the invention.

If one, single-axis sensor 40 is provided, a single vibration feedback signal 76 is provided to the motor controller 50. If multiple sensors 40 or a multi-axis sensor 40 is provided, multiple vibration feedback signals 76 are present. Referring also to FIG. 11, a first vibration feedback signal 76a is illustrated in the top plot and a second vibration feedback signal 76b is illustrated in the lower plot. The two vibration feedback signals may each correspond to a single axis output from separate sensors 40 or may correspond to different axes output from a multi-axis sensor 40. The signals illustrated in FIG. 11, represent, for example, the response to an impulse applied to the belt 204.

According to one embodiment of the invention, the motor controller 50 may include a parameter stored in the memory device 66 defining a threshold above which the motor controller 50 recognizes an impulse was applied to the belt. According to the illustrated embodiment, it is contemplated that the threshold is set equal to one. At the start of each vibration signal 76a, 76b, the amplitude exceeds a positive and negative one and, therefore, the motor controller 50 detects the application of an impulse.

According to another embodiment of the invention, the motor controller 50 applies the impulse by controlling operation of the motor 10 with the motor and belt in a static condition. Because, there is no initial operation of the belt 204 prior to applying the impulse, the motor controller 50 monitors the vibration feedback signals 76 for any amplitude of vibration and attributes the measured vibration to the impulse.

After detecting the vibration resulting from application of the impulse, the motor controller 50 determines a tension on the belt as a result of the monitored vibration feedback signal 76a, 76b. The motor controller 50 may utilize any suitable technique to identify the frequency present on the vibration signal. According to one aspect of the invention, the motor controller 50 utilizes the frequency response module 65 stored in the memory device 66 of the motor controller 50. The frequency response module 65 may be configured to execute a Discrete Fourier Transform(DFT). An exemplary DFT routine is presented below in Eq. 1. The DFT routine transforms a sampled time signal into a complex vector, containing magnitude and phase information, for a number of evenly spaced frequency bins between zero hertz and the sampling frequency of the vibration feedback signal 76.

$$X(k) = \Sigma_{n=1}^{N} x(n) e^{-j2\pi(k-1)(n-1)/N} \text{ for } k=1, \ldots, N/2 \quad (1)$$

where:
X(k)=frequency response at evenly spaced frequencies;
N=number of samples; and
x(n)=nth sample value.

The frequency response includes an amplitude for each frequency component at the evenly spaced frequencies. The amplitude of the frequency content at each of the evenly spaced frequencies with the greatest amplitude responsive to the applied impulse is identified as the natural frequency of the belt 204. The natural frequency of the belt 204 is a function of and varies with the tension applied to the belt. As a result, Eq. 2, presented below, may be used to determine the tension of the belt as a function of the natural frequency of the belt.

$$F_r = 4 \cdot m_k \cdot L^2 \cdot f^2 \quad (2)$$

where:
$F_r$=tension on the belt;
$m_k$=unit mass of the belt;
L=length of belt; and
f=natural frequency of the belt.

The belt tension monitor module 69 in the motor controller 50 may further be configured to provide an output signal corresponding to the tension, $F_r$, present on the belt 204. According to one embodiment of the invention, the belt tension monitor module 69 outputs a signal that includes the amplitude of the tension determined. The output signal may be a data frame in which the value of the tension, $F_r$, is inserted into the payload. Optionally, the motor controller 50 may include a user interface with a display on which the output signal is presented to provide a visual indication of the tension, $F_r$, on the belt 204 to a technician. According to another embodiment of the invention, the belt tension monitor module 69 may be configured to output one or more logic signals corresponding to the amplitude of tension determined. Configuration parameters stored in the memory 66 of the motor controller 50 define a desired level of tension and an upper and lower limit of the acceptable tension, or, optionally, the configuration parameters may store just an acceptable range of tension. The belt tension monitor module 69 compares the measured amplitude of tension to the configuration parameters and outputs a logic signal identifying whether the tension is at the desired setpoint or outside of the acceptable range. The belt tension monitor module 69 may be further configured to output one or more additional logic signals indicating whether the tension is above the acceptable range or below the acceptable range. After receiving the output signal corresponding to the tension present on the belt 204, the technician may increase or decrease the tension and repeat the process of applying an impulse and monitoring the output signal from the motor controller 50 until the tension has been properly set for the belt 204. Utilizing the motor controller 50 to apply an impulse and measure tension on the belt 204 simplifies the commissioning process and eliminates the need for a separate tension meter.

During commissioning, it is further contemplated that the controller may be trained to measure vibration data and to predict belt tension as a function of the measured vibration data. As an initial step in the training, the motor controller 50 obtains data corresponding to known operation of the belt-driven system 201. The tension on the belt 204 is set to a known value and the motor controller 50 is configured to operate the motor 10 at multiple speeds. As the motor 10 runs, the motor controller 50 monitors the magnitude of the vibration signals or the magnitude of frequency components detected in the vibration signals. Further, the motor controller 50 monitors the speed at which the motor 10 is rotating either via a speed command internal to the motor controller or by monitoring the feedback signal from the position feedback sensor 28 from which the speed is determined. Optionally, the motor controller 50 may also monitor the magnitude of current being supplied to the motor. During operation at each of the multiple speeds, the motor controller 50 stores the monitored data in a data log 63 in the memory 66 of the motor controller. The motor controller 50 uses the data corresponding to known operation which was obtained during normal operation of the motor 10 to predict the tension present on the belt 201. After commissioning, the system continues to monitor operation of drive members in the belt-driven system 201. The memory device 66 in the motor controller 50 may store the tension measured during the application of the impulse discussed above in a configuration parameter. Optionally, a configuration parameter may be set to a desired tension from a user interface or via a set of configuration parameters loaded into the memory device 66. The motor controller 50 receives the feedback signal(s) corresponding to vibration present on the belt and periodically determines a tension present on the belt 204 using, for example, the DFT routine discussed above. The belt tension monitor module 69 in the controller compares the current value of tension present on the belt to the previously stored value of tension. If the current value of tension present on the belt varies from the previously stored value of tension beyond a predefined amount, the tension has changed during operation and the belt tension monitor module 69 generates a notification indicating that the tension has changed. The belt tension monitor module 69 may set an internal alarm or fault bit within the motor controller 50 or transmit the notification to the industrial controller 80. Optionally, the notification may be transmitted, alternately or additionally, via a data message to a remote terminal, for example, to alert maintenance personnel that the belt 204 needs to be inspected. With reference to FIG. 4, the remote terminal may be, for example, a computer 91 located either proximate to or remote from the industrial controller 80 via a wired connection, a wireless connection, or a combination thereof. Optionally, the remote terminal may be a mobile device 93, such as a mobile phone, tablet, or laptop computer in communication with the industrial controller 80 via a wired connection, a wireless connection, or a combination thereof. After receiving notification of improper tension on the belt, the maintenance personnel may adjust the tension and/or replace the belt 204 as needed.

If the motor controller 50 has training data stored in the data log 63, the training data is used to predict the tension present on the belt 201. The measured vibration signals vary as a function of the speed at which the motor 10 connected to the belt-driven equipment is operating and as a function of the tension present on the belt 204. With the training data stored in the data log 63, the motor controller can compare the present value of vibration detected and the speed at which the motor 10 is operating against the training data stored in the data log 63 to determine whether the present value of vibration is within an expected range of vibration for the speed of the motor 10. The belt tension monitor module 69 may generate a logic signal identifying whether the tension is at the desired setpoint or outside of the acceptable range. The belt tension monitor module 69 may be further configured to generate one or more additional logic signals indicating whether the tension is above the acceptable range or below the acceptable range. These signals are output to the industrial controller 80, the computer 91, the mobile device 93, or a combination thereof to alert a technician of the status of the belt-driven equipment. After receiving notification of improper tension on the belt, the technician may adjust the tension and/or replace the belt 204 as needed.

According to still another aspect of the invention, the motor controller 50 may detect shock loads occurring in the belt-driven system 201 during operation. A configuration parameter stored in the memory device 66 of the motor controller 50 stores a preset value for vibration. The preset value identifies a threshold of vibration, above which, is indicative of a shock load occurring in the belt-driven system 201. The motor controller 50 receives the feedback signal(s) corresponding to vibration present on the belt and periodically determines a magnitude of vibration present on the belt 204 using, for example, the DFT routine discussed above. The motor controller 50 compares the magnitude of vibration present on the belt to the previously stored threshold of vibration indicative of the occurrence of a shock load. If the magnitude of vibration present on the belt exceeds the threshold, the motor controller 50 generates a notification indicating that a shock load has occurred. The notification may be transmitted via a data message to a remote terminal, for example, to alert maintenance personnel of the shock loading. It is further contemplated that the magnitude of vibration present on the belt may also be stored in the memory device 66. The memory device 66 may include a buffer where a number of values of the magnitude of vibration may be stored. The magnitude of vibration may be transmitted along with the notification of the shock load occurrence such that a technician or maintenance personnel may determine the severity of the shock loading. Optionally, the buffer may be accessed via a remote terminal or via a display on the motor controller to view the severity of each shock load occurrence.

According to another aspect of the invention, the motor controller 50 may be configured to track a number of occurrences of shock loading. A configuration parameter in the memory device 66 of the motor controller 50 may serve as a counter. Each time the motor controller 50 detects the occurrence of a shock load, the motor controller 50 increments the value in the counter. Still another configuration parameter may be configured to store a counter threshold value. Rather than generating a notification for each occurrence of a shock load, the motor controller 50 may be configured to generate a notification when the number of shock loads exceeds the counter threshold value. In still other embodiments of the invention, multiple thresholds may be configured to detect shock loads of varying magnitude. Different reporting requirements may be established based on the severity of the shock load detected.

Figure 9:
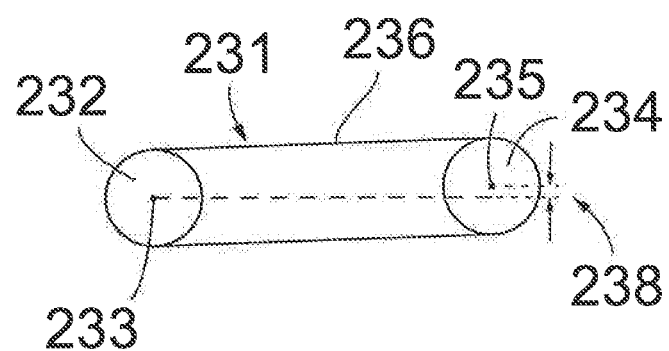
FIG. 9 is an elevational view of a belt-driven system illustrating a first operating condition that introduces vibration into the belt driven system.
Figure 10:
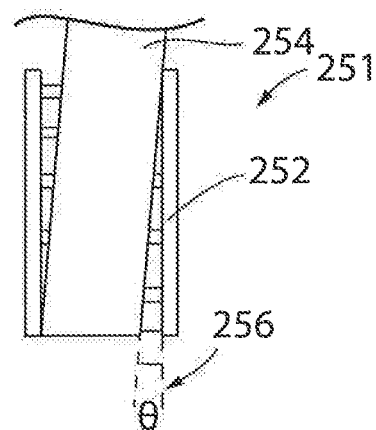
FIG. 10 is a top plan view of a belt and pulley illustrating a second operating condition that introduces vibration into the belt driven system.

According to yet another aspect of the invention, the motor controller 50 may be configured to identify different causes of potential belt failure and provide diagnostic information prior to a failure occurring. With reference also to FIGS. 9 and 10, two potential causes of belt failure are indicated. In FIG. 9, a belt-driven system 231 is illustrated in which an offset 238 between the center axes 233, 235 of two pulleys 232, 234 is present. Due to manufacturing tolerances and/or assembly error, the center axes 233, 235 which should be aligned within the system 231 are offset 238 from each other. The offset 238 may introduce unwanted vibration on the belt 236 extending between the two pulleys 232. In FIG. 10, a segment of a belt-driven system 251 illustrates a belt 254 routed over a pulley 252 where the belt is mis-aligned with the pulley. An angle offset, θ, 256 exists between the actual alignment of the belt 254 and the desired alignment of the belt, where the desired alignment of the belt is parallel to the rotation of the pulley 252. The angle offset, θ, 256 may similarly introduce unwanted vibration on the belt 254.

In either of the illustrated systems 231, 251, the motor controller 50 may be configured to detect vibration resulting from the offset and generate a notification of the identified vibration. Parallel offset 238 and angular offset 256 introduce vibrations in the belt 236, 254 either along the radial or axial directions. In one embodiment of the invention, a pair of sensors 40 are mounted to a non-rotational portion of the motor 10 to isolate sources of vibration in the belt. The sensors 40 are configured as discussed above with respect to FIG. 6. The motor controller 50 utilizes signals from both the sensor 40 at the first position 41 and the sensor 40 at the second position 42 along at least one of the axes, X, Y, or Z, to isolate different vibrations. Using signals from both sensors 40 helps cancel electrical noise that may be generated within the motor 10 and/or by the motor controller 50 and received by the sensors 40 and/or transmitted along the electrical conductors carrying the vibration signals. With reference to Table 1, included below, the motor controller utilizes the vibration signals along the different axes, X, Y, or Z, to isolate different vibrations. Based on the magnitude of vibrations present along each axis, the motor controller 50 determines whether the vibration is radial or axial and may identify whether a parallel offset 238 and/or an angular offset 256 is present in the belt-driven system.

TABLE 1

Vibration isolation as a function of vibration signals detected

| Vibration Isolated | Axes Utilized |
|---|---|
| Rotational vibration | $f_{Ro}$ ($X_2$, $Y_1$) |
| Radial unidirectional vibration | $f_{Ra}$ ($X_1$, $Y_2$) |
| Axial directional vibration | $f_{Ax}$ ($Z_1$, $Z_2$) |

According to yet another aspect of the invention, the motor controller 50 is configured to drive the motor according to an excitation profile stored in the memory 66 of the motor controller 50. The excitation profile includes a predefined speed or speeds at which the motor is to operate. The excitation profile may further include one or more acceleration profiles to vary the rate at which belt-driven changes speeds. As the motor controller 50 commands the motor 10 to operate according to the excitation profile, the signal(s) from the vibration sensor(s) 40 corresponding to vibration present on the belt is monitored by the motor controller 50. The motor controller 50 may determine tension of the belt and monitor the tension and/or the magnitude of vibration present on the belt as the motor executes the excitation profile. Changes in the magnitude of vibration or tension in the belt correspond to dynamic variation or stretch of the belt. The motor controller 50 may monitor the changes in the magnitude of vibration or tension in the belt and generate a notification if the changes exceed a predefined threshold.

The frequency of some vibration signals is static and does not change with rotational speed of the rotor. Other vibration signals are dynamic and are related to the rotational speed of the motor. Identifying the source of a dynamic vibration may require rotating the vibration signals to a reference frame that is synchronous with the rotational speed and direction of the rotor. It is, therefore, another aspect of the invention that the motor controller 50 is configured to sample a feedback signal corresponding to an angular position and/or and angular speed of the rotor. The feedback signal may be generated by a position feedback sensor 28, such as an encoder, resolver, or the like, operatively coupled to the motor 10. The position or speed feedback signal may be sampled in tandem with sampling the feedback signal corresponding to vibration. Further, the signals may be time stamped with reference to a unified time reference to allow subsequent processing and detection of causes of vibration in the controller. Sampling the position or speed feedback signal in tandem with sampling the feedback signal corresponding to vibration allows the motor controller 50 to compare the magnitude of vibration or tension to the rotational speed of the rotor and also to convert the vibration signal to a reference frame that is synchronous with the rotational speed and direction of the rotor. Thus, the position or speed feedback signal allows the motor controller 50 to determine dynamic operating characteristics of the belt-driven system.

The motor controller 50 is operative to maintain a record of operating conditions over time. The log of operating conditions includes tension measurements, magnitudes of vibration, generation of notifications for any specific operating condition, or a combination thereof. The log may be used to detect changes in the belt tension over the operating life of the motor/load due to natural wear (stretch) of the belt and to alert users to readjust the tension in the belt to prevent premature failure of belt due to inadequate tension.

It is further contemplated that the log may be used to determine a remaining useful life of a belt in the belt-driven system. Some level of vibration may be acceptable or unavoidable in the system. The motor controller 50 may monitor the magnitude of vibration over time to determine an expected amount of wear on the belt. The memory device 66 of the motor controller 50 may include, for example, a look up table that corresponds a level of magnitude of vibration to a level of wear in a belt. As the magnitude of vibration or tension present on the belt varies over time the motor controller 50 determines the remaining useful life of the belt and generates a notification for maintenance personnel indicating when the belt needs to be replaced.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for monitoring operation of drive members in a belt-driven system, comprising:
   at least one sensor configured to generate a signal corresponding to a vibration present on a belt in the belt-driven system, wherein a motor is connected to and is operative to drive the belt; and
   a motor controller configured to control operation of the motor, the motor controller including:
   an input configured to receive the signal corresponding to the vibration present on the belt from the at least one sensor;
   a memory device operative to store a plurality of configuration parameters and a plurality of instructions; and
   a processor configured to execute the plurality of instructions to:
   receive the signal from the at least one sensor corresponding to the vibration present on the belt, and
   determine a tension present on the belt as a function of the signal corresponding to the vibration present on the motor.

2. The system of claim 1 wherein the processor is further configured to determine a natural frequency of the belt as a function of the signal corresponding to the vibration present on the belt and to determine the tension present on the belt as a function of the natural frequency of the belt.

3. The system of claim 1 wherein the processor is further configured to:
   receive an input initiating a commissioning step,
   detect an impulse applied to the belt as a function of the signal corresponding to the vibration present on the belt, and
   generate an output signal in response to the impulse, the output signal corresponding to the tension present on the belt.

4. The system of claim 1 wherein the memory device is further configured to periodically store a current value of the vibration present on the belt and wherein the processor is further configured to generate a message when the current value of the vibration present on the belt differs from a stored value of vibration present on the belt by at least a predefined amount.

5. The system of claim 1 wherein the processor is further configured to detect a shock load present on the belt as a function of the signal corresponding to the vibration present on the belt.

6. The system of claim 5 wherein the memory device is operative to store a number of occurrences of the shock load and wherein the processor is operative to increment the number of occurrences each time the shock load is detected.

7. The system of claim 1 wherein the motor controller is operative to perturb the belt with an excitation profile and to determine a dynamic profile of the belt-driven system in response to the excitation profile.

8. The system of claim 1 wherein the motor controller includes a second input configured to receive a signal corresponding to one of a speed and a position of a rotor in the motor and wherein the processor is further configured to synchronously measure the signal corresponding to the vibration and the signal corresponding to the speed or position of the rotor.

9. The system of claim 8 wherein the processor is further configured to determine a remaining useful life of the belt as a function of the measured signal corresponding to the vibration and the measured signal corresponding to speed or position.

10. The system of claim 8 wherein the processor is further operative to identify one of a plurality of failure modes present in the belt as a function of at least one of the signal corresponding to the vibration present on the belt and the signal corresponding to the speed or position of the rotor.

11. The system of claim 10 wherein the identified failure mode is selected from one of an improper tension present on the belt, a misalignment of the belt, excessive wear of the belt, and excessive stretch of the belt.

12. A method for monitoring operation of drive members in a belt-driven system, comprising the steps of:
receiving a signal at an input of a motor controller from at least one sensor corresponding to a vibration present on a belt in the belt-driven system, wherein a motor is connected to and controlled by the motor controller and wherein the motor is operative to drive the belt;
determining a characteristic of the vibration present in the belt-driven system with the motor controller as a function of the signal received at the motor controller; and
determining a tension present on the belt with the motor controller as a function of the characteristic of the vibration present in the belt-driven system.

13. The method of claim 12 further comprising the steps of:
receiving a second input at the motor controller initiating a commissioning step,
detecting an impulse applied to the belt as a function of the signal corresponding to the vibration present on the belt, and
generating an output signal corresponding to the tension present on the belt in response to the impulse.

14. The method of claim 12 further comprising the steps of:
storing a current value of the vibration present on the belt in a memory device present in the motor controller; and
generating a message in the motor controller when the current value of the vibration present on the belt differs from a stored value of vibration present on the belt by at least a predefined amount.

15. The method of claim 12 further comprising the step of detecting a shock load present on the belt as a function of the signal corresponding to the vibration present on the belt.

16. The method of claim 15 further comprising the steps of:
storing a number of occurrences of the shock load in a memory device present in the motor controller; and
incrementing the number of occurrences each time the shock load is detected.

17. The method of claim 12 further comprising the steps of:
controlling operation of the motor with the motor controller in order to perturb the belt according to an excitation profile; and
determining a dynamic profile of the belt-driven apparatus with the motor controller in response to the excitation profile.

18. The method of claim 12 further comprising the steps of:
receiving a signal corresponding to one of a speed and a position of a rotor in the motor at a second input of the motor controller; and
measuring the signal corresponding to the vibration and the signal corresponding to the speed or position of the rotor in tandem.

19. The method of claim 18 further comprising the steps of determining a remaining useful life of the belt as a function of the measured signal corresponding to the vibration and the measured signal corresponding to speed or position.

20. The method of claim 18 further comprising the steps of identifying one of a plurality of failure modes present in the belt as a function of at least one of the signal corresponding to the vibration present on the belt and the signal corresponding to the speed or position of the rotor.

* * * * *